(12) United States Patent
Horibata

(10) Patent No.: US 7,289,401 B2
(45) Date of Patent: Oct. 30, 2007

(54) STORAGE MEDIUM, RECORDING/REPRODUCING APPARATUS, AND RECORDING/REPRODUCING METHOD

(75) Inventor: Yoshihiro Horibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 674 days.

(21) Appl. No.: 10/873,284

(22) Filed: Jun. 23, 2004

(65) Prior Publication Data

US 2005/0025015 A1    Feb. 3, 2005

(30) Foreign Application Priority Data

Jun. 26, 2003  (JP)  ............................. 2003-183314

(51) Int. Cl.
*G11B 5/09* (2006.01)

(52) U.S. Cl. .................................. 369/47.1; 369/275.3
(58) Field of Classification Search ..................... None
See application file for complete search history.

(56) References Cited

U.S. PATENT DOCUMENTS 6,791,937 B2 *  9/2004  Tosaki et al. ............. 369/275.3

* cited by examiner

*Primary Examiner*—Paul W. Huber
(74) *Attorney, Agent, or Firm*—Oblon, Spivak, McClelland, Maier & Neustadt, P.C.

(57) ABSTRACT

In a storage medium such as a DVD+R or DVD+RW disc having a plurality of recording layers, the maximum address (i.e., the maximum physical sector number of a layer) of a user-data-recordable region (data zone) in each recording layer is recorded as physical format information in a wobbling groove. Based on the information, a recording/reproducing apparatus checks the maximum address of a data zone in each recording layer.

10 Claims, 13 Drawing Sheets

| | | Byte Position | Content | Number of Bytes |
|---|---|---|---|---|
| Byte Position 4~15 | Data Zone Allocation | 4 | set to (00) | 1 |
| | | 5~7 | First PSN of Data Zone | 3 |
| | | 8 | set to (00) | 1 |
| | | 9~11 | Maximum PSN of Data Zone (Last Possible PSN of Data Zone) | 3 |
| | | 12 | set to (00) | 1 |
| | | 13~15 | Maximum PSN of Layer 0 (Last Possible PSN of Layer 0) | 3 |

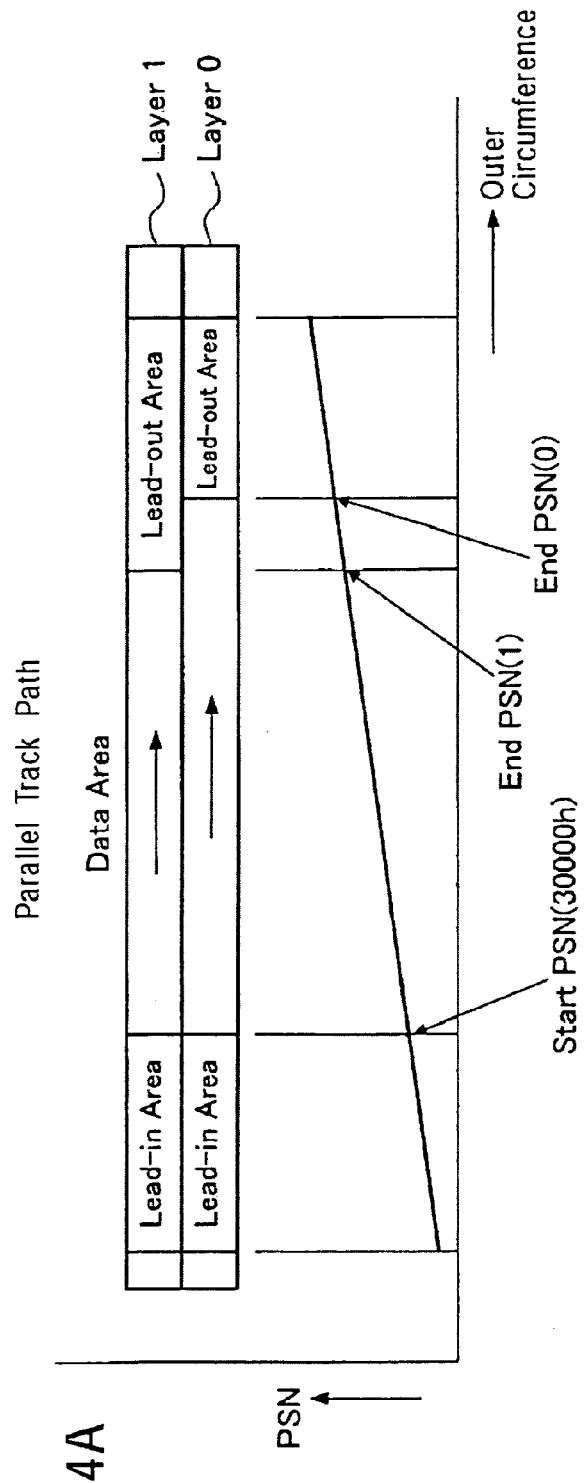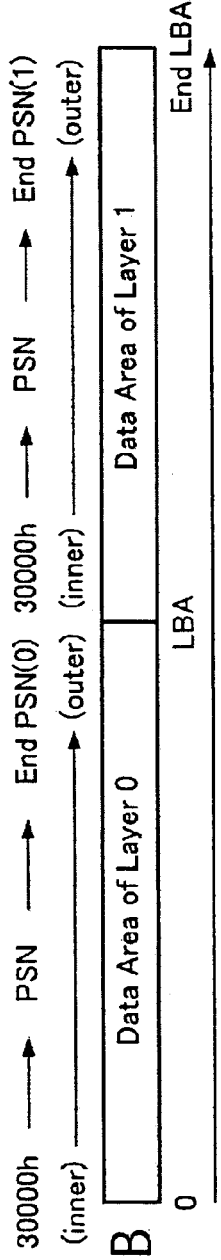
FIG. 4A
FIG. 4B

End PSN(0) : Last PSN of Layer 0
End PSN(1) : Last PSN of Layer 1
$\overline{\text{End PSN(0)}}$ : Inverse of End PSN(0)

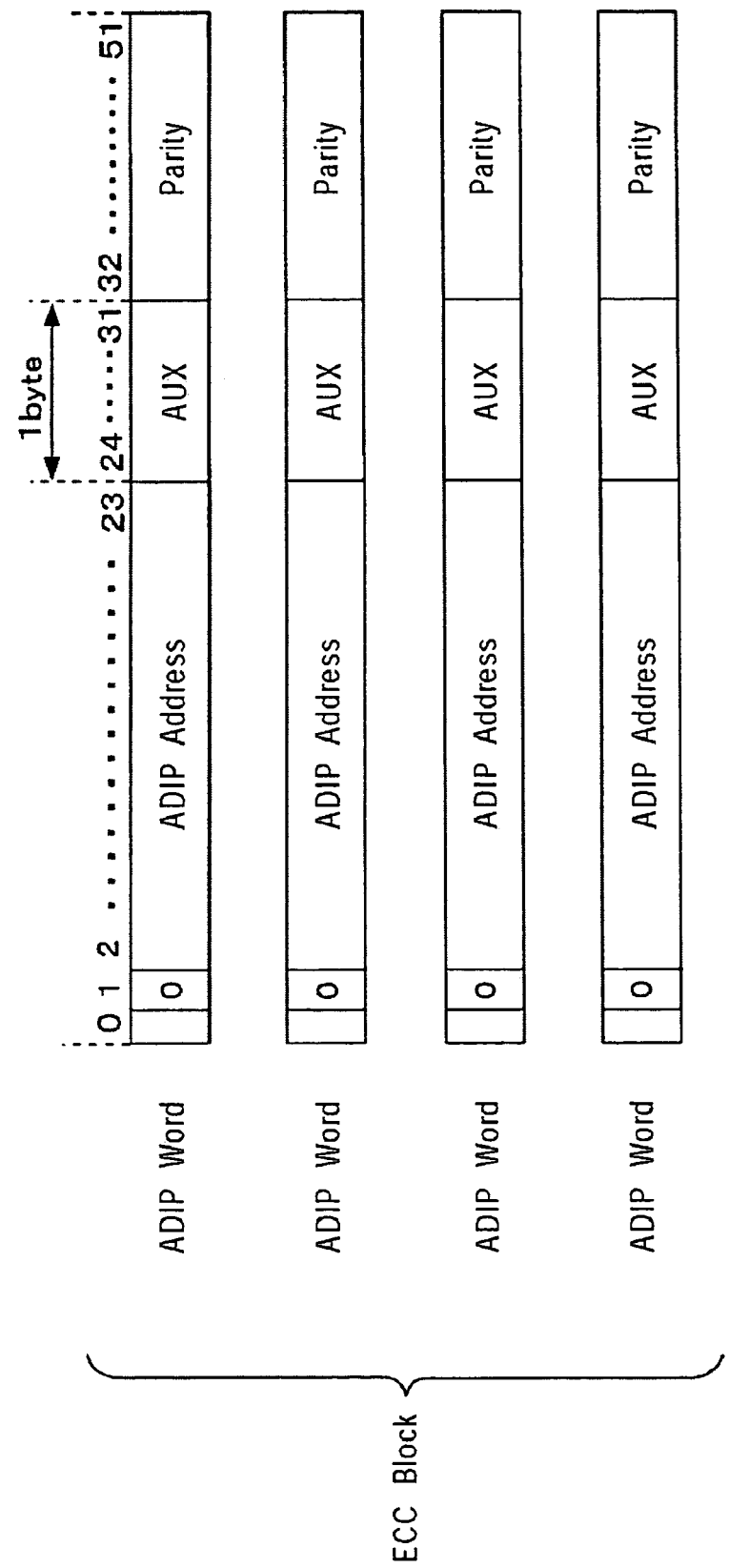

FIG. 8

| Byte Position | Content | Number of Bytes |
|---|---|---|
| 0 | Disc Category and Version Number | 1 |
| 1 | Disc size | 1 |
| 2 | Disc structure | 1 |
| 3 | Recording density | 1 |
| 4 to 15 | Data Zone allocation | 12 |
| 16 | Set to (00) | 1 |
| 17 | Disc Application Code | 1 |
| 18 | Extended Information Indicators | 1 |
| 19 to 26 | Disc Manufacture ID | 8 |
| 27 to 29 | Media type ID | 3 |
| 30 | Product revision number | 1 |
| 31 | number of Physical format information bytes in use in ADIP up to byte 63 | 1 |
| 32 | Recording velocity range for the basic write strategy | 1 |
| 33 | Maximum read power at Reference velocity | 1 |
| 34 | PIND at Reference velocity | 1 |
| 35 | $\rho$ at Reference velocity | 1 |
| 36 | $\varepsilon 1$ at Reference velocity | 1 |
| 37 | $\varepsilon 2$ at Reference velocity | 1 |
| 38 | $\gamma$ target at Reference velocity | 1 |
| 39 | Maximum read power at Upper velocity | 1 |
| 40 | PIND at Upper velocity | 1 |
| 41 | $\rho$ at Upper velocity | 1 |
| 42 | $\varepsilon 1$ at Upper velocity | 1 |
| 43 | $\varepsilon 2$ at Upper velocity | 1 |
| 44 | $\gamma$ target at Upper velocity | 1 |
| 45 | Maximum read power at Intermediate velocity | 1 |
| 46 | PIND at Intermediate velocity | 1 |
| 47 | $\rho$ at Intermediate velocity | 1 |
| 48 | $\varepsilon 1$ at Intermediate velocity | 1 |
| 49 | $\varepsilon 2$ at Intermediate velocity | 1 |
| 50 | $\gamma$ target at Intermediate velocity | 1 |
| 51 | Ttop first pulse duration | 1 |
| 52 | Ttop multi pulse duration | 1 |
| 53 | dTtop first pulse lead time | 1 |
| 54 | dTera erase lead time at Reference velocity | 1 |
| 55 | dTera erase lead time at Upper velocity | 1 |
| 56 | dTera erase lead time at Intermediate velocity | 1 |
| 57 to 63 | Reserved-All(00) | 7 |
| 64 to 95 | Extended Information block 0 | 32 |
| 96 to 127 | Extended Information block 1 | 32 |
| 128 to 159 | Extended Information block 2 | 32 |
| 160 to 191 | Extended Information block 3 | 32 |
| 192 to 223 | Extended Information block 4 | 32 |
| 224 to 255 | Extended Information block 5 | 32 |

FIG. 9

| | Byte Position | Content | Number of Bytes |
|---|---|---|---|
| Byte Position 4~15 | 4 | set to (00) | 1 |
| | 5~7 | First PSN of Data Zone | 3 |
| | 8 | set to (00) | 1 |
| Data Zone Allocation | 9~11 | Maximum PSN of Data Zone (Last Possible PSN of Data Zone) | 3 |
| | 12 | set to (00) | 1 |
| | 13~15 | Maximum PSN of Layer 0 (Last Possible PSN of Layer 0) | 3 |

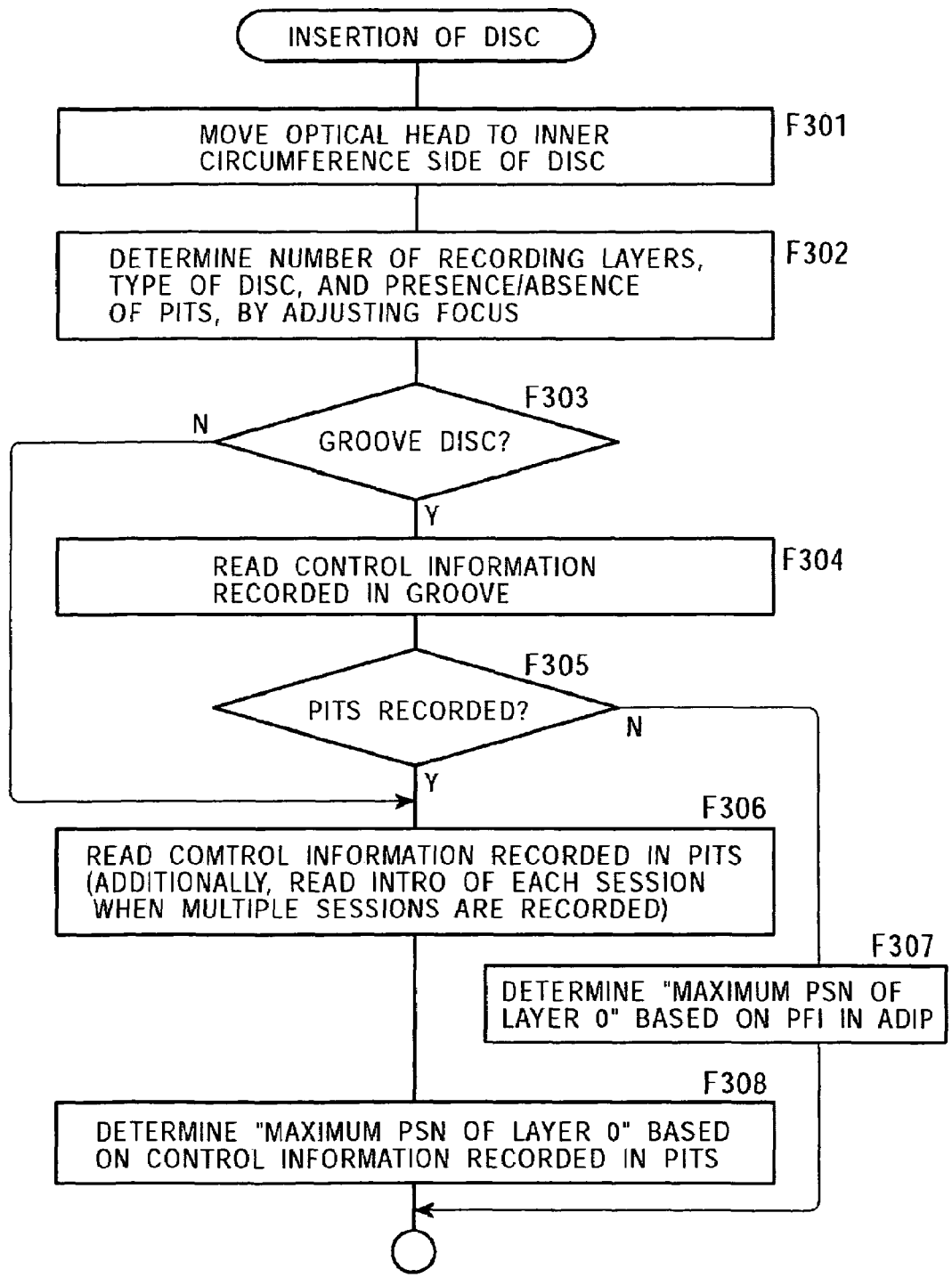

STORAGE MEDIUM, RECORDING/REPRODUCING APPARATUS, AND RECORDING/REPRODUCING METHOD

BACKGROUND OF THE INVENTION

1. Field of the Invention

The present invention relates to a storage medium such as a data-recordable disc having a plurality of information recording layers and to a recording/reproducing apparatus and a recording playback method for the storage medium.

2. Description of the Related Art

Optical discs, optical cards, and so on have been known as optical storage media to and/or from which information can be optically recorded and/or reproduced. Information is recorded to or reproduced from such optical storage media by using laser light of a semiconductor laser or the like as a light source, converging the laser light into a tiny light beam through a lens, and illuminating the optical storage media with the light beam.

For the optical storage media, techniques for increasing the recording capacities are under intense development. Conventional approach for increasing the information recording density of optical discs has been focused on increasing the recording density of recording surfaces of the discs. For example, attempts have been made to reduce the track pitch and to increase the recording density in the direction of linear velocity at recording and reading/scanning, in combination with a reproducing operation performed by a reproducing system and a reduction in the wavelength of a light source that emits a recording beam.

However, shortening the wavelength of a light source is limited to an ultraviolet region and the size of pits can only be reduced to a size transferable to a disc during a cutting process. As a result, attempts to improve the recording density will eventually encounter a limit in a two-dimensional disc region.

Accordingly, an approach to increasing the capacity from the three-dimensional perspective has also been made. That is, attention has been directed to a multilayer disc formed by laminating information recording layers to increase the density of recorded information in the disc thickness direction.

A multilayer storage medium having laminated recording layers can multiply the recording capacity according to the number of recording layers and can readily be integrated with another high-density recording technology. As multilayer storage media, for example, DVD-ROM (digital versatile disc read only memory) discs, which are read-only discs, are already put to practical use.

For example U.S. Pat. Nos. 5,682,372, 5,740,136, 5,793,720, and 6,424,614 disclose configurations of read-only optical discs having two recording layers and technologies applicable to recording and reproducing information to and from such optical discs.

In the future, in addition to ROM discs, it is anticipated that recordable multilayer storage media having laminated recordable recording-layers containing phase-change material, magneto-optical material, dye material are put to practical use. For example, in the case of DVD discs, it is also expected that multilayer recording layers are incorporated into write-once discs, such as DVD-R and DVD+R, and rewritable discs, such as DVD-RW, DVD+RW, and DVD-RAM.

Naturally, for a write-once or rewritable multilayer storage medium, user data is recorded in each layer. Thus, a recording apparatus needs to check a maximum position where user data can be recorded (i.e., a maximum address in a region where user data can be recorded) in each layer.

In general, for a write-once recordable disc or rewritable disc, a user-data-recordable region (data zone) is set based on a format, but information of the first address and the maximum address is recorded on the disc. Thus, based on the information, a recording/reproducing apparatus can check a region for the data zone to control a recording operation.

For example, for a dual-layer disc, a data zone exists in both a first layer (layer 0) and a second layer (layer 1) and thus the first address of the data zone is located at a certain address in layer 0 and the maximum address is located at a certain address in layer 1. That is, when only layer 0 is considered, the maximum address of the data zone is not recorded therein.

In essence, however, the maximum address is defined as a disc physical format. Thus, even when the maximum address for each layer is recorded in the disc, this does not directly lead to inconvenience in a recording/reproducing operation. That is, with respect to a disc loaded, it is sufficient for the recording/reproducing apparatus to perform operation by considering the maximum address of a data zone in each layer as an address value defined by the format, without checking a physical address recorded on the disc.

Such a situation, however, is not preferable when future format changes, including an expansion and a change in the recording capacity, are considered.

In order to allow a recording/reproducing apparatus to flexibly deal with format changes of a disc having a plurality of recording layers, the recording/reproducing apparatus needs to be able to easily check the maximum address of a data zone in each layer for each disc.

By way of example, for DVD+R and DVD+RW discs, addresses, which are known as ADIP (ADress In Pregroove), and physical format information are pre-recorded by wobbling recording tracks.

The physical format information contains the first address and the maximum address of a data zone. For dual-layer discs, however, since a data zone lies across two recording layers, the maximum address of layer 0, which address being logically located at an intermediate position, is not recorded. Thus, the recording/reproducing apparatus performs operation using a maximum address specified by the format, which makes it difficult to deal with a change in the format and so on.

SUMMARY OF THE INVENTION

Accordingly, in view of the foregoing situations, an object of the present invention is to allow a recording/reproducing apparatus to easily check the maximum position of a user-data recordable region in each recording layer in a recordable disc having a plurality of recording layers.

To achieve the foregoing object, one aspect of the present invention provides a storage medium. The storage medium includes a plurality of recording layers to which data is recordable and wobbling grooves that are pre-formed in relation to the plurality of recording layers as recording tracks in accordance with addresses and physical format information. The physical format information contains information of a maximum position at which user data is recordable in each recording layer.

Another aspect of the present invention provides a recording/reproducing apparatus for the storage medium. The recording/reproducing apparatus includes a recording/reproducing unit for recording and/or reproducing data to and/or from each recording layers, and a groove-information reading unit for reading the addresses and the physical format information which are recorded with the wobbles of the grooves. The recording/reproducing apparatus further includes a controlling unit for checking a user-data-recordable maximum position based on the physical format information read by the groove-information reading unit, to control a recording/reproducing operation.

Preferably, the controlling unit causes the recording/reproducing unit to record control information, containing the physical format information, in a predetermined region of the storage medium at predetermined timing after recording of the user data, and the value of the maximum position information is changed in accordance with an actual recording state of the user data. The maximum position information is a content of the physical format information contained in the control information.

Still another aspect of the present invention provides a recording/reproducing method for the storage medium. The recording/reproducing method includes a groove-information reading step of reading the addresses and the physical format information which are recorded with the wobbles of the grooves, and a checking step of checking a user-data-recordable maximum position based on the physical format information read in the group-information reading step. The recording/reproducing method further includes a controlling step of performing predetermined control for a recording/reproducing operation, in accordance with the user-data-recordable maximum position checked in the checking step.

Preferably, the recording/reproducing method further includes a control-information recording step of recording control information, containing the physical format information, in a predetermined region of the storage medium at predetermined timing after recording of the user data. In the control-information recording step, the value of the maximum position information is changed in accordance with an actual recording state of the user data. The maximum position information is a content of the physical format information contained in the control information.

Thus, according to the present invention, in a storage medium such as a DVD+R or DVD+RW disc having a plurality of recording layers, the maximum address of a user-data-recordable region (data zone) in each recording layer is recorded as physical format information in a wobbling groove. Based on the information, the recording/reproducing apparatus checks the maximum address of a data zone in each recording layer.

As can be understood from the above description, in the storage medium according to the present invention, the maximum address of a user-data recordable region in each recording layer is recorded as physical format information in a wobbling groove. Thus, based on the information, the recording/reproducing apparatus can check the maximum address of a data zone in each layer. That is, for each disc, the recording/reproducing apparatus can check the maximum address of a data zone in each layer of the disc and can control a recording/reproducing operation based on the maximum address.

This arrangement advantageously can facilitate dealing with a data-zone change resulting from future format expansion/change.

Since controlling for recording/reproducing operation, involving regulating a recording region in each layer and a movement during access, is performed based on the checked maximum address, the recording/reproducing apparatus according to the present invention can deal with various types of storage media having different formats (for data zone regions).

According to the present invention, at predetermined timing after user data is recorded, control information containing the physical format information is recorded in a predetermined region of a storage medium, and the value of information of a user-data-recordable maximum position, which is a content of the physical format information contained in the control information, is changed in accordance with the actual recording state of the user data. Thus, the maximum address of each layer after recording is reflected in the control information (i.e., the lead in). This arrangement, therefore, can perform appropriate control by checking the maximum address based on the control information.

BRIEF DESCRIPTION OF THE DRAWINGS

FIGS. 4A and 4B are diagrams illustrating a parallel track path;

FIG. 7 shows an ECC block unit of ADIP;

FIG. 8 is a table showing PFI in ADIP;

FIG. 9 is a table showing a data zone allocation of the PFI in the ADIP;

FIG. 13 is a flow chart showing processing upon the insertion of a disc in the embodiment.

DESCRIPTION OF THE PREFERRED EMBODIMENT

An embodiment of the present invention will be described below in the following sequence.
1. Configuration of Disc
1-1 Area Structure of Recording Layer
1-2 Dual-layer Disc
1-3 ADIP Structure
2. Disc Drive Apparatus
2-1 Configuration of Apparatus
2-2 Close Processing for Write-once Disc
2-3 Lead-in Update Processing for Rewritable Disc
2-4 Processing upon Insertion of Disc
3. Modification
  1. Configuration of Disc
  1-1 Area Structure of Recording Layer An embodiment of the present invention will now be described in connection with DVDs (Digital Versatile Discs) as large-capacity disc storage media. A disc drive apparatus, which is described below, records and/or reproduces information to and/or from a DVD.

For recordable DVD discs, multiple types of standards, including DVD+R, DVD-R, DVD-RW, DVD-RW, and DVD-RAM, are available. A description herein will be given, by way of example, of a DVD+R disc, which is a write-once medium, and a DVD+RW disc, which is a rewritable disc.

For example, when a DVD+R or DVD+RW disc is loaded into a disc drive apparatus (i.e., a recording apparatus), information unique to the disc is read from ADIP (ADdress In Pre-groove) information written in a wobbling groove in a recording surface, so that the disc is identified as a DVD+R or DVD+RW disc. The identified disc is subjected to recording and is then ejected from the recording apparatus. The disc may be loaded into the recording apparatus again. In such a case, the disc may be loaded into the same recording apparatus again or may be loaded into another recording apparatus or reproducing apparatus for data exchange.

In view of such usages, the logical format of DVDs is designed to ensure smooth recording compatibility and playback compatibility between apparatuses.

Figure 1:
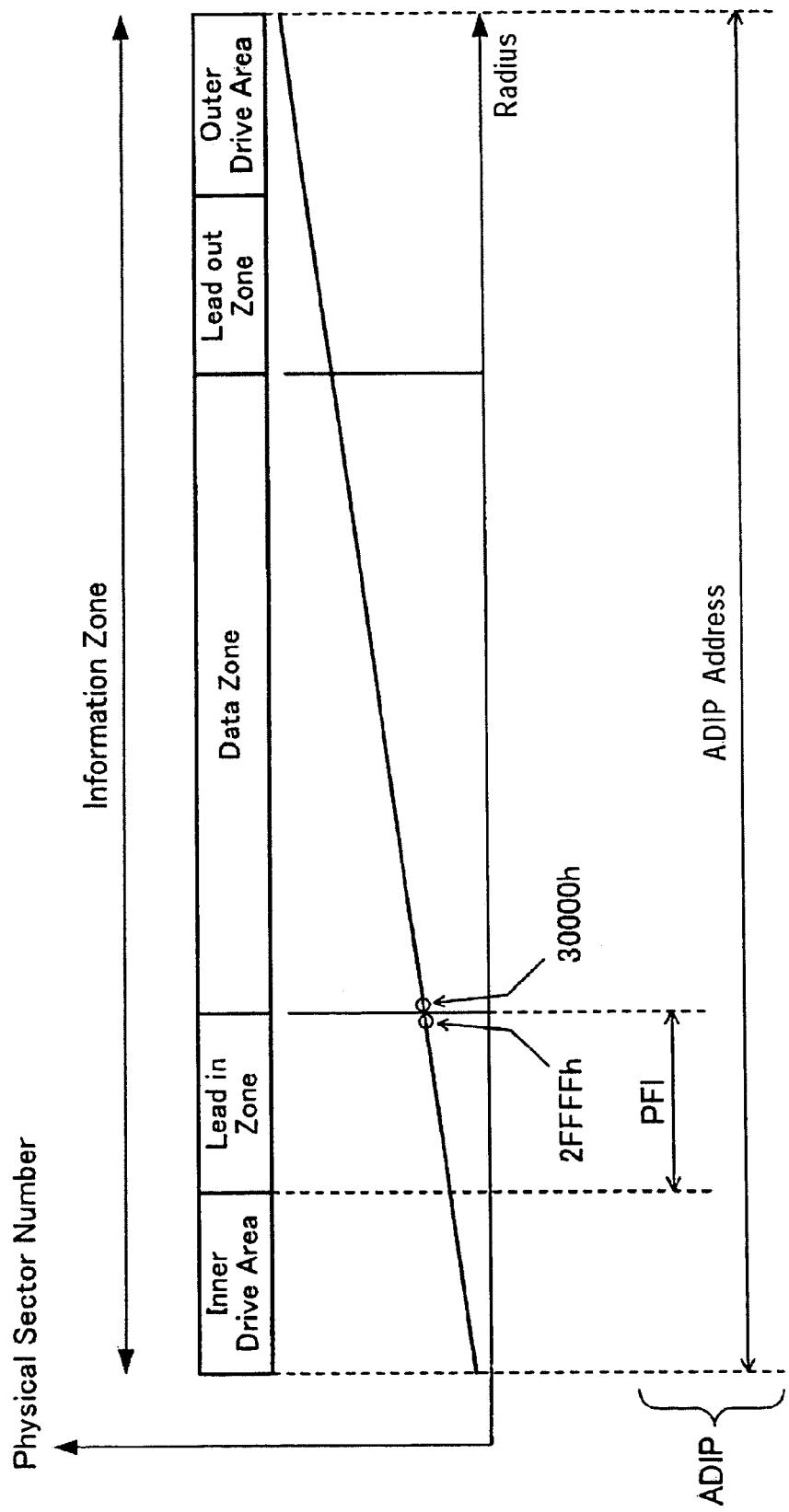
FIG. 1 shows a data area structure and physical sector numbering.

FIG. 1 shows a layout of a recording layer of DVD+R and DVD+RW discs. As shown, in a logical data layout of a recording layer of DVD+R and DVD+RW discs, an information zone is provided from the inner-circumference side of the disc to the outer-circumference side. The information zone contains all information needed to ensure data recording compatibility and playback compatibility.

The information zone contains one or more sessions.

The information zone primarily contains the following five sections:
1) Inner Driver Area
2) Lead-in Zone (or Lead-in Area)
3) Data Zone (or Data Area)
4) Lead-out Zone (or Lead-out Area)
5) Outer Drive Area The lead-in zone, the data zone, and the lead-out area are located in a region that can be readily accessed even by a read-only apparatus.

The inner drive area and the outer drive area are used exclusively for a recording apparatus. When information is recorded, laser power for recording must be adjusted such that appropriate recording marks can be formed. Thus, a test zone that can be used for test recording for determining an optimum recording condition and an area that can be used for recording control information relevant to recording conditions are provided in the inner drive area and the outer drive area. As a result of test recording, the recording state of the test zone becomes uneven, and thus there is no guarantee that the test zone can be accessed by a read-only apparatus without any problem. The test zone, therefore, is located at a position that is not accessible by a read-only apparatus.

Physical sector numbers (PSNs) are assigned as absolute position information on the disc.

As shown, the physical sector numbers increase, for example, from the disc inner-circumference side toward the outer-circumference side. For a DVD+R disc, a position where the PSN is 2FFFFh (the numeric value with h is expressed in a hexadecimal representation) indicates the end of the lead-in zone and a position where the PSN is 30000h indicates the start of the data zone.

The data zone is essentially a zone to which user data is written and the lead-in zone is a zone to which control information is written. The lead-out zone is a zone to which dummy data is written, for example, for maintaining compatibility with read-only discs.

In a DVD+R or DVD+RW disc, the entire information zone can be used for writing data and a wobbling groove is formed as a recording track. During recording, tracking the groove allows a track to be appropriately traced in a non-recording region where pits (i.e., dye-change pit marks or phase-change pit marks) are not provided.

Further, ADIP information is recorded by wobbling the groove. The physical sector numbers (PSNs) are recorded as ADIP addresses in the information zone.

In addition to the ADIP addresses, the ADIP information contains physical format information (PFI), which is described below.

In particular, as shown in FIG. 1, the PFI is repeatedly recorded as ADIP information in the lead-out zone.

With regard to recordable discs such as DVD+R and DVD+RW discs, when compatibility with read-only discs are desired (i.e., when playback with a read-only apparatus is to be made possible), close processing needs to be performed to finalize recording with the configuration of a session (which may also be referred to as a "border") consisting of a lead-in zone, a data zone where no unrecorded portion remains, and a lead-out zone.

For a write-once medium such as a DVD+R disc, after user data is written to a data zone with a recording apparatus, a session (or the entire disc) is closed (i.e., finalized). In this case, appropriate control information is recorded in the lead-in zone, and in the data zone, a region to which user data has not been written is filled with dummy data (i.e., a lead-out), so that the medium can also be played back with another reproducing apparatus. In other words, when the medium is in an unclosed state (i.e., in an open state), appropriate control information has not yet been recorded in the lead-in zone. Thus, at this point, the medium lacks playback compatibility. Further, when an unrecorded region where no pits are formed exists in the data area, a read-only apparatus cannot perform tracing appropriately. Accordingly, dummy data is written to the medium. One major cause for the above-described problem is that tracking error detection systems are different between recorded regions and unrecorded regions and thus the read-only apparatus is not compatible with the tracking error system for unrecorded regions.

As described above, for a write-once disc, playback compatibility can be attained by performing close processing at a point when writing of necessary user data is completed and no additional writing is yet performed. After the close processing, any more writing cannot be performed on the disc. On the other hand, while a disc is in the open state, the disc does not have playback compatibility but is in a state in which additional data can be written.

For a rewritable disc, even once it is finalized, additional data can be recorded by erasing data.

Such a situation causes a problem specific to write-once discs. Specifically, once recording is completed on a DVD+R disc based on a session configuration, even if an unrecorded portion remains, the unrecorded portion cannot be used permanently.

Accordingly, the concept of multiple sessions has been introduced to compensate for the problem of the single session layout that wastes a remaining unrecorded region. The multi-session can achieve playback compatibility by only making minimal change to a read-only apparatus.

For a multi-session DVD+R disc, multiple sessions up to 191st session are available.

Each session includes:
1) Intro,
2) Data zone, and
3) Closure.

Each session becomes available for data recording by opening (i.e., opening processing) and is finalized by closing (i.e., close processing).

When an unrecorded data zone remains on the disc, a session can be added by the opening. In such a case, data in an inner session can be logically imported into the new session. The intro and closure act similarly to the above-described lead-in and lead-out, respectively. During the update of the lead-in zone or the update of information in the lead-in zone after a next session is completed, the intro and the closure are used to temporarily store current information and, in terms of attributes, to record ordinary data. Thus, the intro and the closure are given names that are different from the lead-in and the lead-out.

Figure 2A:
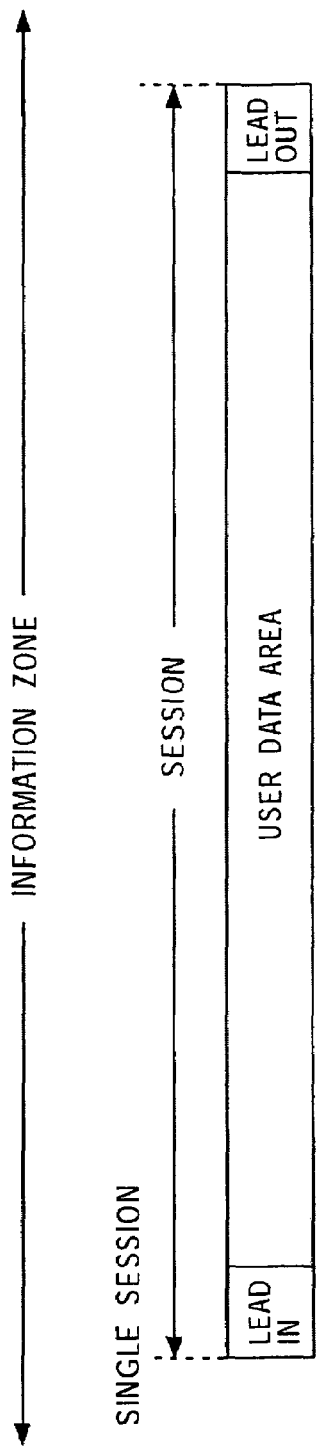
FIGS. 2A and 2B show session structures of write-once discs, respectively.
Figure 2B:
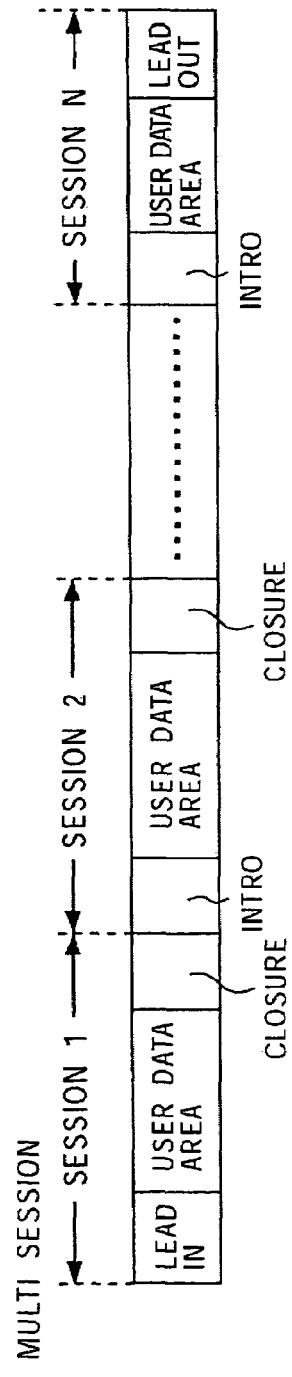

FIGS. 2A and 2B show session layouts.

FIG. 2A shows a single-session configuration.

In the information zone, the lead-in zone is followed by a user data area, in which user data is recorded, and the user data area is followed by the lead-out zone.

FIG. 2B shows a multi-session configuration.

In the information zone, in a region between the lead-in zone and the lead-out zone, session-1, session 2, ..., and session N are provided sequentially from the beginning.

First session 1 contains the lead-in zone, a user data area, and a closure.

Second session 2 contains an intro, a user data area, and a closure.

Last session N contains an intro, a user data area, and the lead-out zone.

As can be understood from comparison with FIG. 1, for the multi-session disc, first session 1 contains the lead-in zone that precedes the data zone shown in FIG. 1.

Last session N contains the lead-out zone that follows the data zone shown in FIG. 1.

As described above, one session needs to be completed by a lead-in zone, a data zone, and a lead-out zone. For the multi-session disc, however, not every session can contain a lead-in zone and a lead-out zone, and thus areas for intros and closures are provided.

For example, in session 1, a closure is provided instead of a lead-out zone; in session 2, an intro is provided instead of a lead-in zone and a closure is provided instead of a lead-out zone; and in last session N, an intro is provided instead of a lead-in zone.

The user data area in session 1 to the user data area in session N shown in FIG. 2B are contained in a zone corresponding to the data zone shown in FIG. 1. That is, the intros and the closures lie within a zone corresponding to the data zone shown in FIG. 1. This is the reason why the intros and the closures have attributes in which they are recorded as ordinary data.

1-2 Dual-layer Disc

Now, a dual-layer recordable DVD having two recording layers will be discussed. This dual-layer DVD has a structure in which recording layers, which are constituted by dye-change recording films or phase-change recording films, are laminated in two layers with relatively small spacing therebetween.

Figure 3:
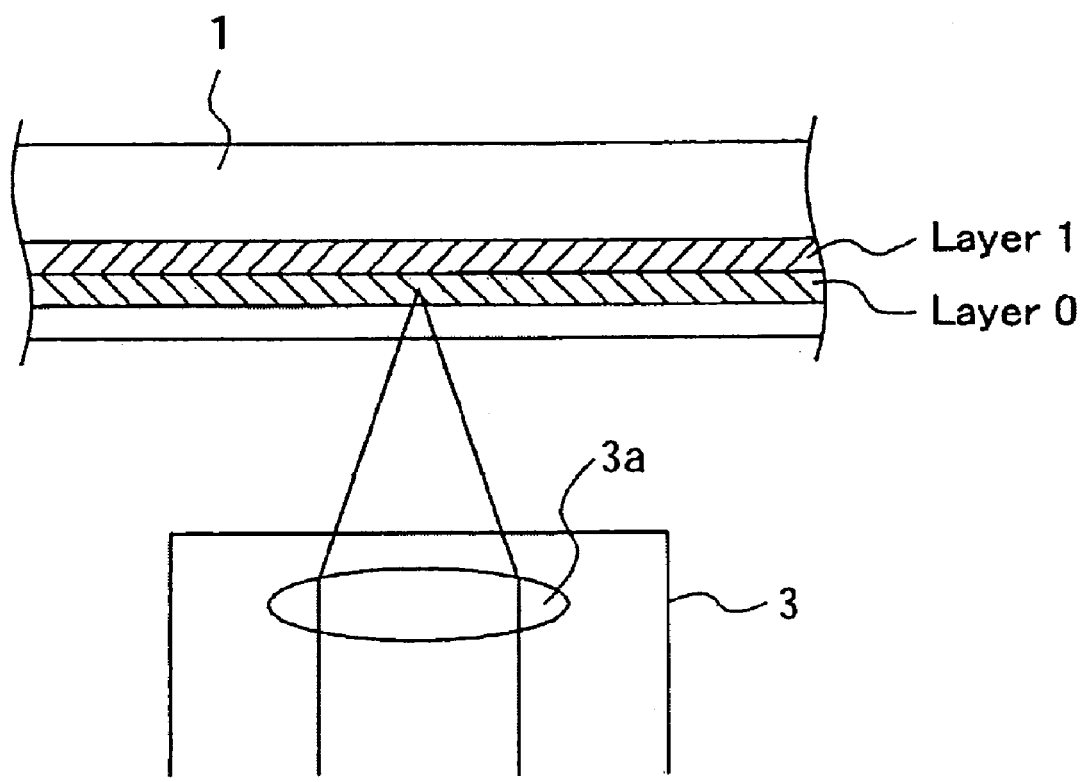
FIG. 3 is a diagram illustrating a dual-layer disc.

FIG. 3 schematically shows a disc 1 that has two laminated recording layers, i.e., layer 0 and layer 1.

When recording is performed on such a dual-layer disc, laser light emitted by an optical pickup (optical head) 3 of a disc drive apparatus is focused on either of the recording layers via an objective lens 3a, so that signals are recorded on the recording layer.

Viewed from the objective lens 3a, layer 0 is a near-side recording layer and layer 1 is a far-side recording layer.

For the dual-layer disc, two recording systems, namely, a parallel track path and an opposite track path, are available.

FIGS. 4A and 4B show a case of a parallel track path.

As described above, the physical sector numbers (PSNs) are real addresses recorded on the disc. By contrast, logical block addresses (LBAs), or logical block numbers, are addresses given to an array of logical data handled by a computer. The PSNs and the LBAs are associated with each on a one-to-one basis.

For the parallel track path shown in FIG. 4A, in each of layers 0 and 1, a lead-in area, a data area, and a lead-out area are provided from the inner-circumference side toward the outer-circumference side.

Data is recorded from Start PSN(=30000h) at the inner-circumference side of layer 0 to End PSN(0), which indicates the end of the data area of layer 0. Subsequently, data is recorded from Start PSN(=30000h) at the inner-circumference side of layer 1 to End PSN(1) at the outer-circumference side.

Figure 5A:
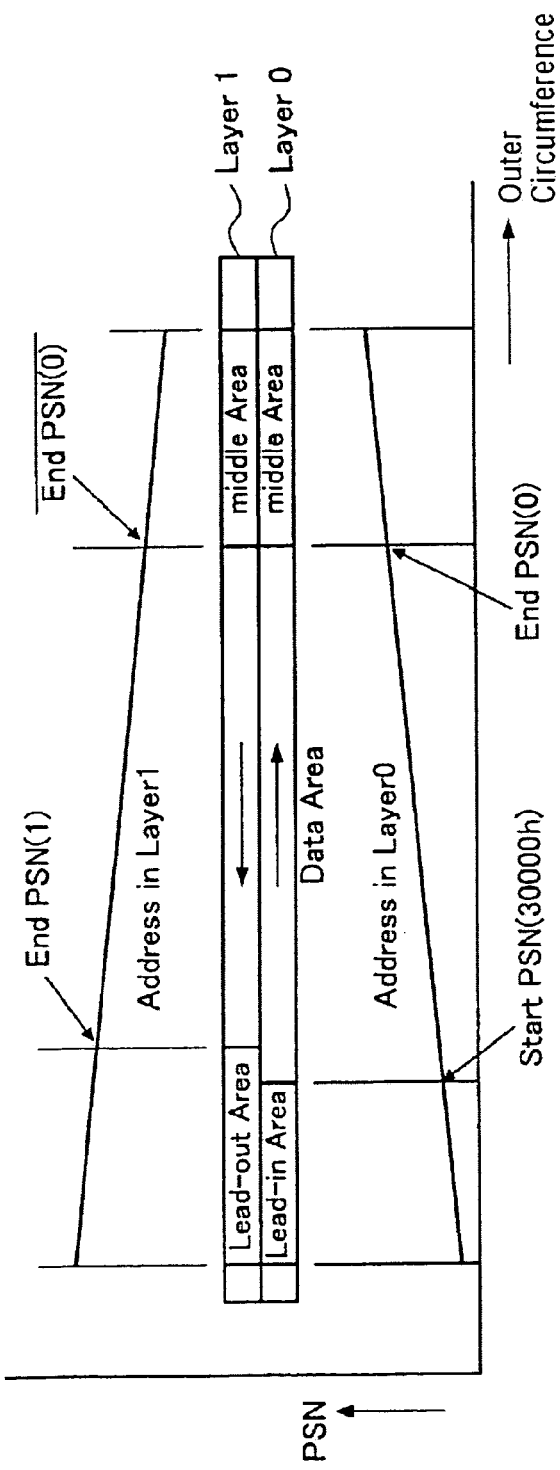
FIGS. 5A and 5B are diagrams illustrating an opposite track path.
Figure 5B:
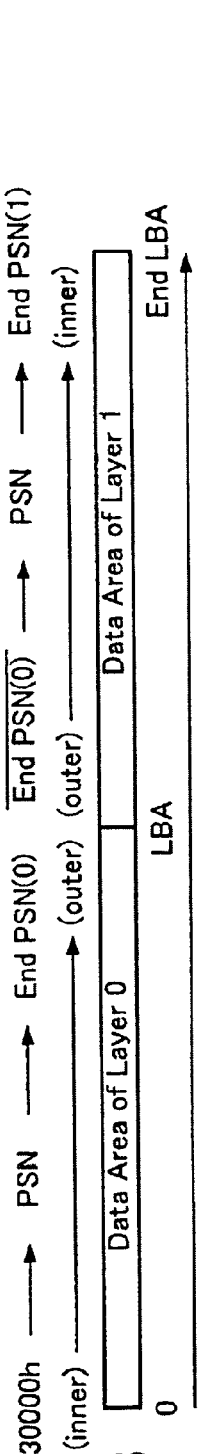

As shown in FIG. 4B, the logical block addresses LBA are sequentially assigned from the inner-circumference side of layer 0 to the outer-circumference side and further from the inner-circumference side of layer 1 to the outer-circumference side FIGS. 5A and 5B show a case of an opposite track path. In a disc having an opposite track path, data is recorded from the inner-circumference side of layer 0 to the end of layer 0 and is then recorded from the outer-circumference side of layer 1 toward the inner-circumference side.

As shown in FIG. 5A, for the opposite track path, in layer 0, a lead-in area, a data area, and a middle area are provided from the inner-circumference side toward the outer-circumference side. Further, in layer 1, a middle area, a data area, and a lead-out area are provided from the outer-circumference side toward the inner circumference.

Data is recorded from Start PSN(=30000h) at the inner circumference of layer 0 to End PSN(0), which is the end of the data area of layer 0. Subsequently, data is sequentially recorded from the outer-circumference side (i.e., the inverse of End PSN(0)) of the data area of layer 1 toward End PSN(1) of the inner-circumference side.

As shown in FIG. 5B, the logical block addresses LBA are sequentially assigned from the inner-circumference side of layer 0 to the outer-circumference side and are, in a returning manner, from the outer-circumference side of layer 1 to the inner-circumference side.

In this manner, the parallel track path and the opposite track path are different from each other in a physical storage method (i.e., the sequence) of data.

For the opposite track path, middle areas are added to the portions outside the interlayer-return portion. The reason is as follows. For the opposite track path, the lead-in area is provided in layer 0 and the lead-out layer is provided in layer 1. Thus, neither a lead-in area nor a lead-out area is provided at the outer-circumference side of the data area. Further, since a read-only apparatus reads pits recorded on a disc surface, and thus can neither perform servo-operation nor read data with stability with respect to a pit-free area. As a result, the opposite track path requires a region that serves as a guard. This necessitates the formation of the middle areas at the outer-circumference side, where, for example, dummy data is recorded to provide the same function as a lead-out area.

1-3 ADIP Structure

The structure of ADIP information, which is recorded as a wobbling groove, will now be described.

Figure 6A:
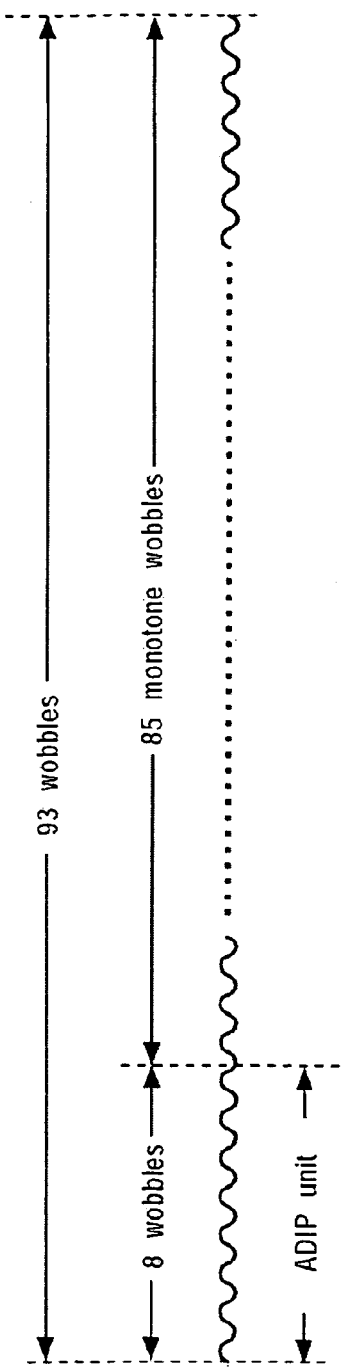
FIGS. 6A and 6B are diagrams illustrating ADIP information.

FIG. 6A shows a wobbling unit. One wobble corresponds to a section of 32 channel bits, and 8 wobbles and 85 monotone wobbles, i.e., 93 wobbles, constitute one unit including an ADIP unit.

Further, 85 monotone wobbles correspond to unmodulated 85 wave wobbles. The first 8 wobbles are phase-modulated in accordance with information so as to have information as one ADIP unit.

Figure 6B:
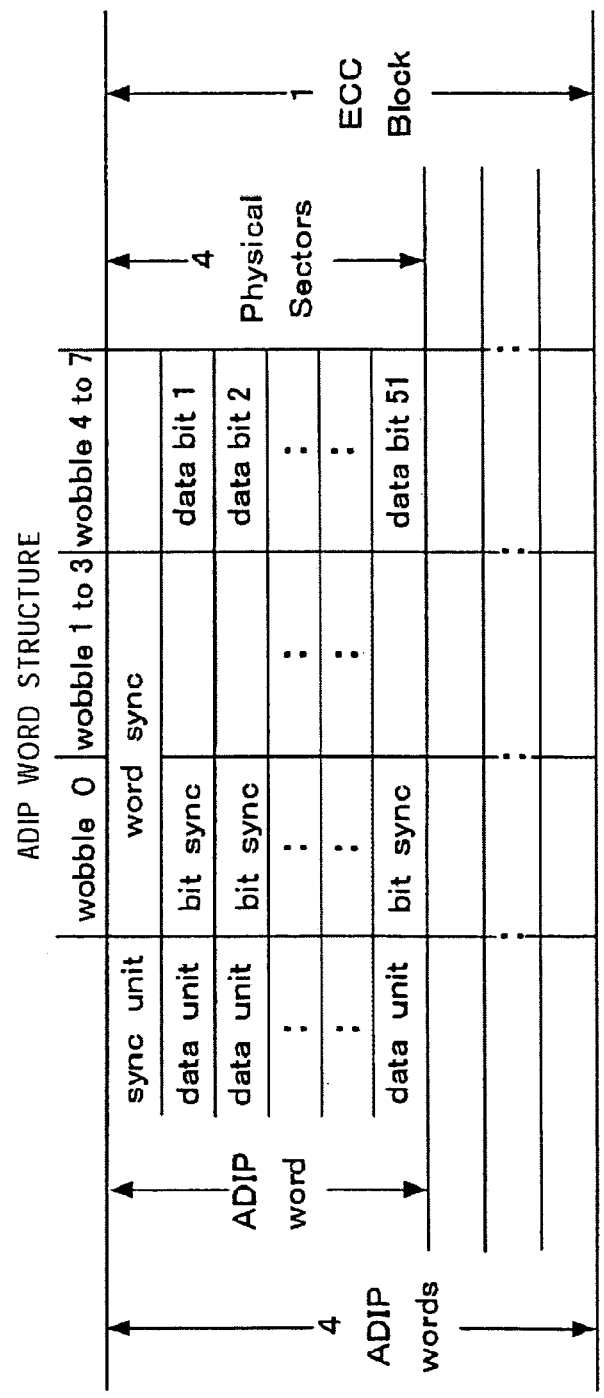

FIG. 6B shows an ADIP word structure.

A group of 52 ADIP units, each unit being constituted by 8 wobbles as described above, constitutes one ADIP word.

Wobble 0, wobbles 1 to 3, and wobbles 4 to 7 shown in FIG. 6B represent respective eight wobbles that constitute one ADIP unit.

The first ADIP unit of the of the ADIP word is defined as a sync unit, and wobble 0 and wobbles 1 to 3 are defined as wobbles that are phase-modulated as a word sync.

The second and later ADIP units in the ADIP word are defined as data units, respectively, and wobble 0 represents bit syncs and wobbles 4 to 7 represent data bits (i.e., data "1" or "0")

One ADIP word, which is constituted by 52 ADIP units, corresponds to four physical sectors.

Four ADIP words constitute one ECC block, which provides ADIP information.

FIG. 7 shows four ADIP words constituting an ECC block.

From one ADIP word, 51-bit data is extracted (data bits 1 to 51) except for a word sync, as described above, and data bits 2 to 23 are used to record ADIP addresses.

Data bits 24 to 31 are used for AUX data.

Data bits 32 to 51 are used for an ECC parity.

The ADIP addresses provided by data bits 2 to 23 are recorded throughout the information zone.

As ADIP information in the lead-in zone, the PFI (physical format information) is recorded with one-byte AUX data per ADIP word (i.e., four-byte AUX data for each ECC block).

Further, 256 bytes of PFI provides one information unit. That is, AUX data having four bytes for each ECC block is gathered to 256 bytes and PFI as shown in FIG. 8 is read out. Such PFI is repeatedly recorded in the lead-in zone predetermined times using AUX data.

As in the content of the PFI shown in FIG. 8, the PFI contains various types of physical format information at respective predetermined byte positions. Examples include a disc category and version number, disc size, disc structure, recording density, data zone allocation, disc application code, extended information indicator, disc manufacture ID, media type ID, and so on.

This PFI provides various types of disc-related information, such as a disc type, size, and zone configuration, as well as linear velocity information during a recording/reproducing operation.

FIG. 9 shows the details of data-zone allocation information of byte positions 4 to 15.

As shown in FIG. 9, the first PSN (physical sector number) in the entire data zone is recorded at the three bytes of byte positions 5 to 7.

The maximum PSN in the entire data zone is recorded at the three bytes of byte positions 9 to 11.

The dual-layer (DVD+R or DVD+RW) disc in the present embodiment is adapted such that maximum PSN of a data zone in layer 0 is particularly recorded at the three bytes of byte positions 13 to 15. That is, the maximum PSN indicates a maximum position that can be used for a data zone in layer 0.

For the cases of the dual-layer discs shown in FIGS. 4A to 5B, PSNs indicated by those information items can be expressed as follows.

The first PSN of a data zone including data zones of layers 0 and 1 is indicated by "Start PSN" shown in FIGS. 4A to 5B.

The maximum PSN of the data zone including data zones of layers 0 and 1 is indicated by "End PSN(1)" shown in FIGS. 4A to 5B.

The maximum PSN of a data zone in layer 0 is indicated by "End PSN(0)" shown in FIGS. 4A to 5B.

That is, in the present embodiment, the maximum PSN of layer 0 is recorded in the PFI, thereby providing the maximum address of a user-data recordable region in layer 0. For layer 1, the maximum PSN of the data zone provides a maximum address in a user-data-recordable region. Thus, since information of the maximum PSN of layer 0 is contained in the PFI, it is possible to determine the maximum address of a data zone in each recording layer based on the PFI.

That is, according to the present embodiment, in a recordable medium such as DVD+R or DVD+RW disc having a plurality of recording layers, the maximum address of a user-data-recordable region (data zone) in each recording layer is recorded as physical format information recorded in a wobbling groove. This allows a recording/reproducing apparatus to check the maximum address of a data zone in each layer, based on the physical format information.

2. Disc Drive Apparatus 2-1 Configuration of Apparatus

A disc drive apparatus of the present embodiment which is used for the above-described dual-layer disc (e.g., dual-layer DVD+R or DVD+RW disc) will now be described with reference to FIG. 10.

Figure 10:
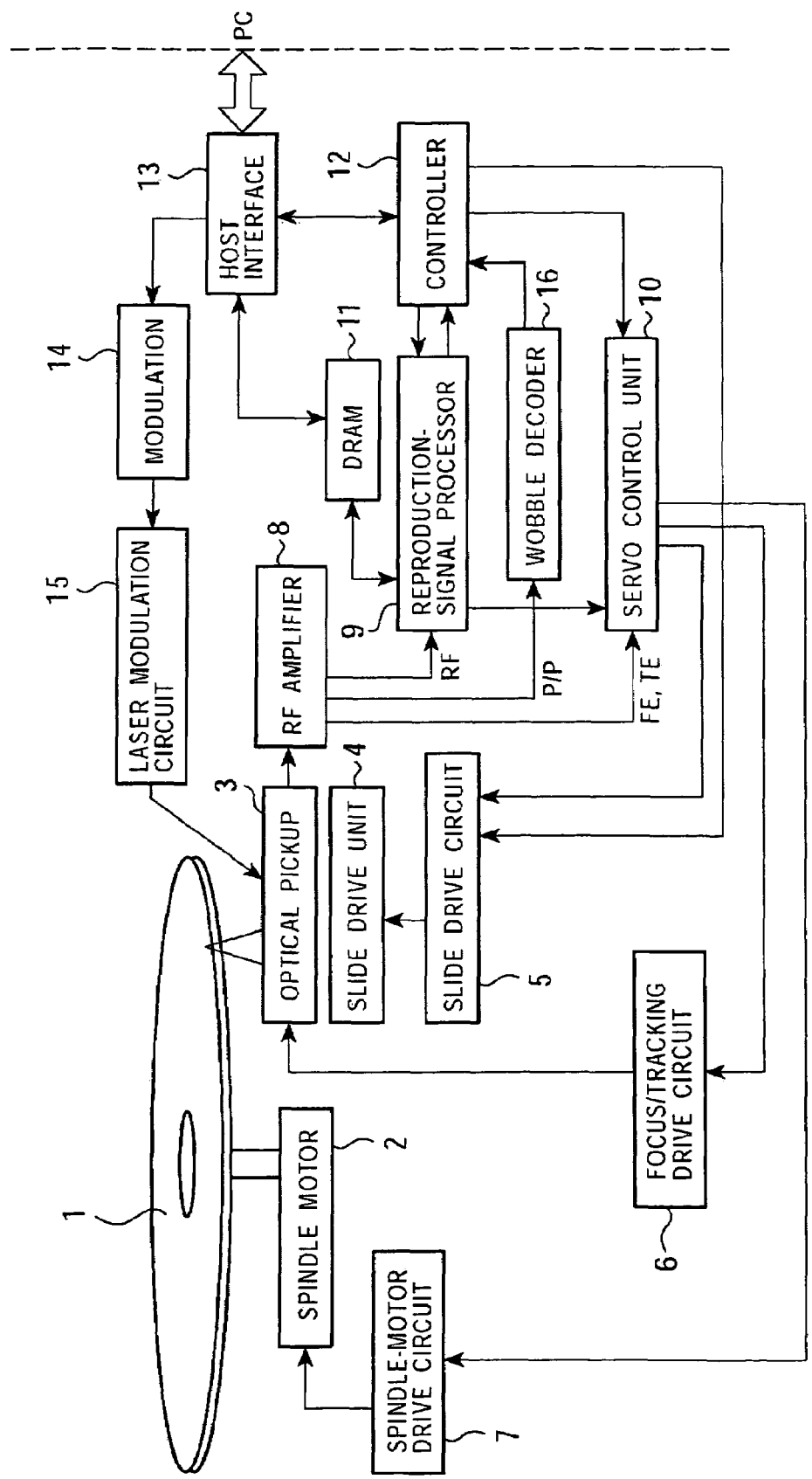
FIG. 10 is a block diagram showing a recording/reproducing apparatus according to an embodiment.

FIG. 10 is a block diagram showing a major portion of a disc drive apparatus of the present embodiment.

A disc 1 is placed on a turn table, which is not shown, and is rotated and driven at a constant linear velocity (CLV) or a constant angular velocity (CAV) by a spindle motor 2 during a recording/reproducing operation. The pickup 3 reads data that is recorded on the disc 1 in the form of embossed pits, dye-change pits, phase-change pits, or the like.

The pickup 3 includes a laser diode that provides a laser light source, photodetectors for detecting reflected light, an objective lens that serves as the output end of laser light, an optical system, and a two-axis mechanism. The optical system illuminates the disc recording surface with laser light via the objective lens and guides light reflected from the disc recording surface to the photodetectors. The two-axis mechanism holds the objective lens such that it can move in a tracking direction and a focus direction.

The entire pickup 3 can be moved by a slide drive unit 4 in the disc radial direction.

Light information reflected from the disc 1 is detected by the photodetectors and is converted into an electrical signal corresponding to the intensity of received light, and the electrical signal is supplied to an RF amplifier 8.

The RF amplifier 8 includes a current-voltage conversion circuit, a matrix-calculation/amplification circuit, and so on so as to correspond to current output from the photodetectors in the pickup 3. The RF amplifier 8 performs matrix-calculation processing to generate necessary signals. Examples of the signals include an RF signal that serves as reproduction data, a focus error signal FE for servo-control, and a tracking error signal TE.

The RF amplifier 8 supplies the reproduction RF signal to a reproduction-signal processor 9 and also supplies the focus error signal FE and the tracking error signal TE to a servo control unit 10.

For a ROM disc and a recorded region of a recordable disc, the tracking error signal TE is detected by a differential phase detection (DPD) system. On the other hand, for an unrecorded region of a recordable disc, the tracking error signal TE is detected by a push-pull system. Thus, the system for generating the tracking error signal TE at the RF amplifier 8 can be switched depending on a disc type and (recorded/unrecorded) areas on the disc 1.

For a recordable disc, a track is formed with a wobbling groove. As described above, ADIP information is recorded with wobbles of the groove. The components of wobbles can be obtained by the RF amplifier 8 as, for example, push-pull signals P/P, which are supplied to a wobble decoder 16 for detection of the ADIP information.

The reproduction RF signal provided by the RF amplifier 8 is subjected by the reproduction-signal processor 9 to binarization, PLL clock generation, decode processing for EFM+ signal (i.e., an eight-to-sixteen modulated signal), and error-correction processing.

The reproduction-signal processor 9 performs decode processing and error-correction processing by using a DRAM (dynamic random access memory) 11. The DRAM 11 is used as a memory for storing data obtained via a host interface 13 and is also used as a cache for transferring data to a host computer.

The reproduction-signal processor 9 accumulates decoded data in the DRAM 11 that serves as the cache memory.

Data buffered in the DRAM 11 is read, transferred, and output as a reproduction output of the disc drive apparatus.

Out of information obtained by performing EFM+ demodulation and error correction on the RF signal, the reproduction-signal processor 9 extracts subcode information, address information, control information, and appended information, and supplies the extracted information to a controller 12.

From the push-pull signal, the wobble decoder 16 decodes the ADIP information (or, for example, LPP information, ATIP information, and sector ID information depending on a disc type), which is recorded in wobbling grooves. The wobble decoder 16 further extracts address information (ADIP addresses) and physical format information (PFI), which are recorded in the wobbling grooves, and supplies the extracted information to the controller 12.

The controller 12 is implemented by, for example, a micro computer to control the entire apparatus.

The host interface 13 is connected to external host equipment, such as a personal computer, and communicates reproduction data, read/write command, and so on with the host equipment.

Reproduction data stored in the DRAM 11 is output and transferred to the host equipment via the host interface 13.

A read/write command, record data, and other signals that are transmitted from the host equipment via the host interface 13 are buffered in the DRAM 11 or are supplied to the controller 12.

A write command and record data are supplied from the host equipment so that recording is performed on the disc 1.

When data is recorded, the record data buffered in the DRAM 11 is subjected by a modulation unit 14 to processing for recording. Examples of the processing include error-correction-code addition and EFM+ modulation.

The resulting record data is supplied to a laser modulation circuit 15. In accordance with the record data, the laser modulation circuit 15 drives a semiconductor laser in the pickup 3 to cause laser light to be output, thereby writing data to the disc 1.

During the recording operation, the controller 12 performs control such that the pickup 3 illuminates a recording region of the disc 1 with laser light at a recording power level.

When the disc 1 is a write-once disc that uses a dye-change film as a recording layer, illumination with laser light at a recording power level causes a dye change to thereby form pits (recording marks).

When the disc 1 is a rewritable disc having a phase-change recording layer, a temperature increased by the laser light changes the crystal structure of the recording layer to thereby form phase change pits (recording marks). Thus, various types of data are recorded by the presence/absence and varied lengths of pits. When a portion where pits are formed is illuminated with laser light again, the crystal state that has changed during data recording returns to its original state. Consequently, the pits disappear and thus the data is erased.

For example, in accordance with the focus error signal FE and the tracking error signal TE sent from the RF amplifier 8 and a spindle error signal SPE sent from the reproduction-signal processor 9 or the controller 12, the servo control unit 10 generates various servo-drive signals for focus, tracking, sled, and spindle servos, and executes servo operations.

Thus, the servo control unit 10 generates a focus drive signal and a tracking drive signal in accordance with the focus error signal FE and the tracking error signal TE, and supplies the generated drive signals to a focus/tracking drive circuit 6. The focus/tracking drive circuit 6 drives a focus coil and a tracking coil of the two-axis mechanism in the pickup 3. Thus, the pickup 3, the RF amplifier 8, the servo control unit 10, the focus/tracking drive circuit 6, and the two-axis mechanism form a tracking servo loop and a focus servo loop.

In order to turn on the focus servo, a focus search operation must first be executed. The focus search operation is to detect a position at which the focus error signal FE exhibits an S-shaped curve while forcibly moving the objective lens with the focus servo being turned off. As is well known to those skilled in the art, a linear region of an S-shaved curve of a focus error signal is a region where the position of the objective lens can be brought into a focus position by closing the focus servo loop. Thus, the focus search operation is performed by detecting the "focus brought-in region" while forcibly moving the objective lens and by turning on the focus servo at the detection-based timing. This focus servo operation can keep the laser spot to be focused.

In the case of the present embodiment, the disc 1 may have a dual-layer structure with layer 0 and layer 1, as described above.

Naturally, when a recording/reproducing operation is performed on layer 0, the laser light must be focused on layer 0. Similarly, when a recording/reproducing operation is performed on layer 1, the laser light must be focused on layer 1.

Such shift of the focus position between layer 0 and layer 1 is performed by a focus jump operation.

When the laser light is focused on one layer, the focus jump operation is executed by turning off the focus servo to forcibly move the objective lens and by turning on the focus servo at a point when the objective lens reaches within the focus brought-in region for the other layer (i.e., at a point when an S-shaped curve is observed).

The servo control unit 10 further supplies a spindle drive signal, generated in accordance with the spindle error signal SPE, to a spindle-motor drive circuit 7. In response to the spindle drive signal, the spindle-motor drive circuit 7 supplies, for example, a three-phase drive signal to the spindle motor 2, thereby rotating the spindle motor 2. The servo control unit 10 also generates a spindle drive signal in response to a spindle kick/brake control signal sent from the controller 12, thereby causing the spindle-motor drive circuit 7 to execute operations, such as the start, stop, acceleration, and deceleration of the spindle motor 2.

For example, the servo control unit 10 generates a slide error signal, which is obtained as a low frequency component of the tracking error signal TE, and also generates a slide drive signal in accordance with an access-executing-control signal and so on sent from the controller 12. The servo control unit 10 then supplies the generated signals to a slide drive circuit 5. The slide drive circuit 5 drives a slide drive unit 4 in response to the slide drive signal. The slide drive unit 4 has a mechanism (not shown) constituted by a sled motor, transmission gears, a main shaft for holding the pickup 3, and so on. In response to the slide drive signal, the slide drive circuit 5 drives the slide drive unit 4 to perform required slide movement of the pickup 3.

As described above, during recording, the laser modulation circuit 15 performs driving such that laser light corresponding to record data is output from the laser diode in the pickup 3. More specifically, during recording, the laser modulation circuit 15 causes laser light, modulated based on the record data, to be output at a high level of laser power, and during reproduction, the laser modulation circuit 15 causes laser light to be continuously output at a low level of laser power.

Thus, the laser modulation circuit 15 includes a write strategy circuit for generating a laser modulation signal and shaping the waveform thereof in accordance with the record data, a laser drive circuit for driving the laser diode, and a power-control circuit for controlling the laser power at a constant level.

The laser power is controlled during reproduction and during recording such that predetermined reproduction-laser power and recording-laser power are output with stability. That is, a monitor detector (not shown) provided in the pickup 3 supplies a laser-power monitor signal to the power control circuit in the laser modulation circuit 15. In turn, by comparing the monitor signal with a reference level (i.e., a level set for the reproduction-laser power or recording-laser power), the power control circuit controls an output of the laser drive circuit to stabilize the power of laser light output from the laser diode.

The recording-laser power and the reproduction-laser power must be set to their respective optimum values depending on the disc 1. Thus, for example, when the disc 1 is loaded into the apparatus, the controller 12 performs a test-write recording/reproducing operation on the disc 1 to execute processing for searching for the optimum laser-power values. For example, the controller 12 checks jitter and/or an error rate while varying the laser power in a step-by-step manner, thereby searching for optimum laser-power values. The controller 12 then sets the found optimum recording-laser power and reproduction-laser power in the power control circuit of the laser modulation circuit 15 as reference levels, respectively. By doing so, optimum laser power control is performed during recording and during reproduction.

For the dual-layer disc, optimum laser power is set for each recording layer. Thus, processing for setting optimum laser power is performed for each recording layer.

2-2 Close Processing for Write-Once Disc

As described above, on the disc 1 in the embodiment, the maximum address (i.e., the maximum PSN) of a data zone in each recording layer is recorded in the PFI in the ADIP information. Thus, when the disc 1 is loaded, the disc drive apparatus can determine a maximum address that can be used for a data zone in each recoding layer, based on the PFI.

Now, close processing or lead-in update processing after recording of user data will be described first, and then processing that is executed by the disc drive apparatus upon the loading of the disc 1, i.e., processing for checking a maximum address that can be used for a data zone in each recording layer will be described.

First, session close processing for a write-once disc (DVD+R disc) will be described.

Figure 11:
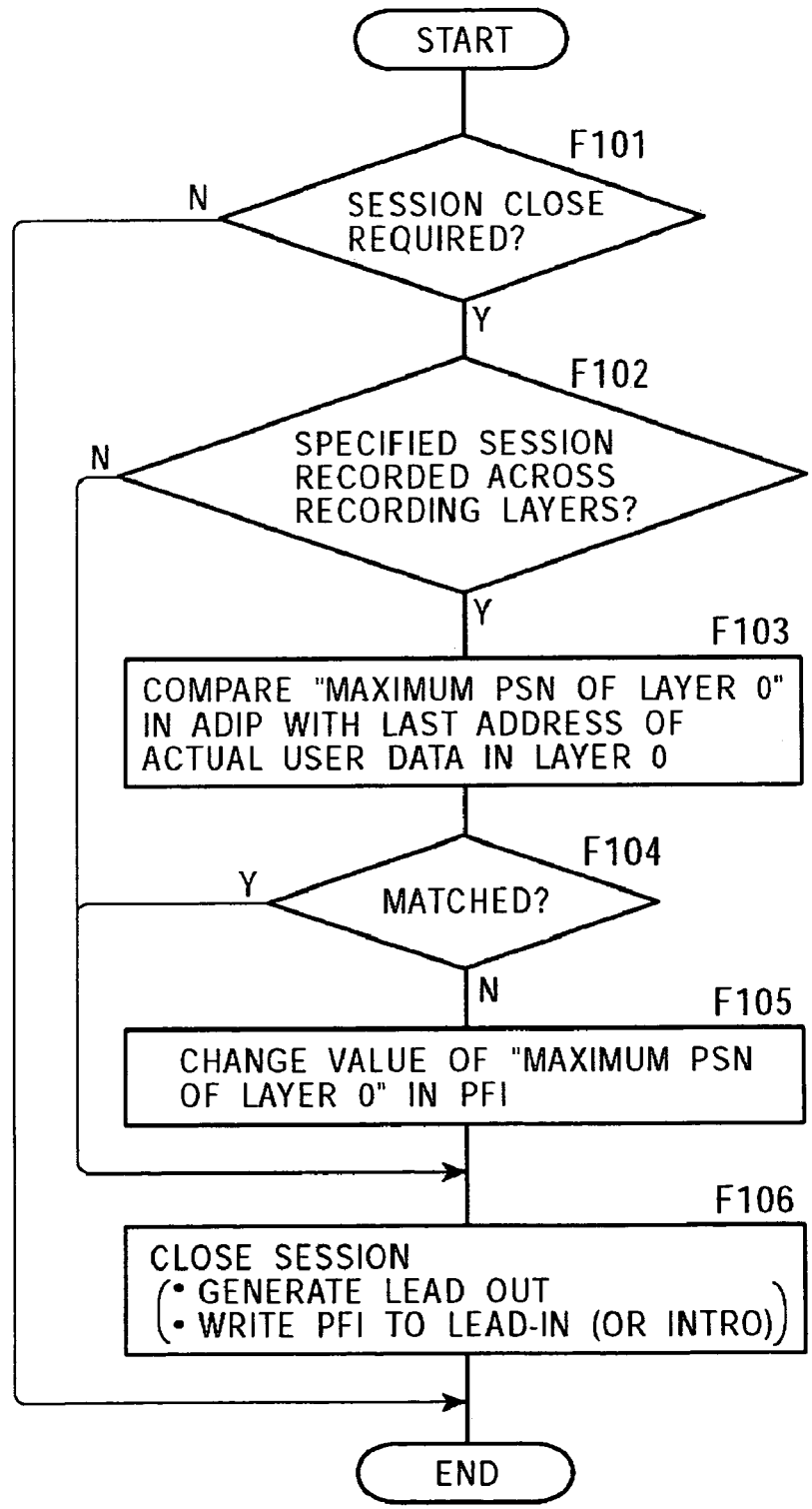
FIG. 11 is a flow chart showing close processing for a write-once disc in the embodiment.

FIG. 11 shows session close processing executed by the controller 12.

The session close processing is performed, for example, when an instruction for closing a session is issued from host equipment after user data is recorded in a data zone of the loaded desk 1 or when an instruction for closing a certain session is issued from host equipment during multi-session recording.

In response to the session-close instruction (i.e., a session close command) issued from host equipment, the controller 12 determines in step F101 shown in FIG. 11 that a session close is required and then the process proceeds to step F102.

In step F102, the controller 12 determines whether or not data of a session specified by the session close instruction has been recorded across a plurality of recording layers. That is, with respect to the session, the controller 12 determines whether or not user data has been recorded across layer 0 and layer 1.

When the controller 12 determines that user data is not recorded across a plurality of layers, the process proceeds to step F106. In step F106, session close processing is performed for that session. That is, a lead-out is formed using, for example, dummy data so as to be contiguous to the end of the user data and also a lead-in (or an intro) is recorded. For close processing for a single session as shown in FIG. 2A or session 1 of multi sessions as shown in FIG. 2B, a lead-in is recorded. Alternatively, for close processing for a session after session 2 of multi-sessions, an intro is recorded.

Control information recorded in the lead-in or intros includes file information of recorded user data and the PFI (physical format information) that has been read out as ADIP information upon the loading of the disc 1. That is, the content of the PFI is used, without being changed, as part of control information in the lead-in (and intros). Thus, the value of "maximum PSN of layer 0" in the PFI is not changed either.

When it is determined in step F102 that data of a session specified by the session close instruction has been recorded across a plurality of recording layers, the process proceeds to step F103. In step F103, the value of "maximum PSN of layer 0" obtained as ADIP information is compared with the last address at which user data has actually been recorded in layer 0.

When the last address at which the user data has been recorded matches the value of "maximum PSN of layer 0", this means a case in which the data zone in layer 0 is fully utilized to record the user data. On the other hand, when they do not match each other, this means that recording shifted to layer 1 without fully utilizing the data zone in layer 0.

When the result of the comparison shows a match, the process proceeds from step F104 to step F106, in which session close processing is performed.

Specifically, a lead-out is formed, for example, with dummy data so as to be contiguous to the end of user data and a lead-in (or an intro) that contains content of the PFI is recorded. In this case as well, "maximum PSN of layer 0" in the PFI is not changed.

When the result of the comparison in step F103 does not show a match, the process proceeds from step F104 to step F105. In step F105, the value of "maximum PSN of layer 0" in the PFI which has been read is changed to the value of the last address at which the actual user data has been recorded.

In step F106, session close processing is performed. Specifically, a lead-out is formed with, for example, dummy data so as to be contiguous to the end of the user data, and a lead-in (or intro) that contains content of the PFI is recorded. Thus, in this case, "maximum PSN of layer 0" in the PFI recorded as control information in the lead-in (or intro) is changed in accordance with the actual recording state of the user data.

As described above, during session closing for a session recorded across a plurality of layers of a write-once disc, when the end of user data recorded in layer 0 is different from "maximum PSN of layer 0" in the PFI in the ADIP, control information for a lead-in or an intro includes the PFI content with which "maximum PSN of layer 0" being changed.

2-3 Lead-in Update Processing for Rewritable Disc

Next, a lead-in processing for a rewritable disc (DVD+RW disc) will be described.

Processing for updating the control information in a lead-in is performed when an instruction is issued from host equipment or when the disc 1 is ejected after user data is recorded in a data zone of the disc 1 loaded.

In addition, when the disc 1 is finalized, the lead-in is updated.

Figure 12:
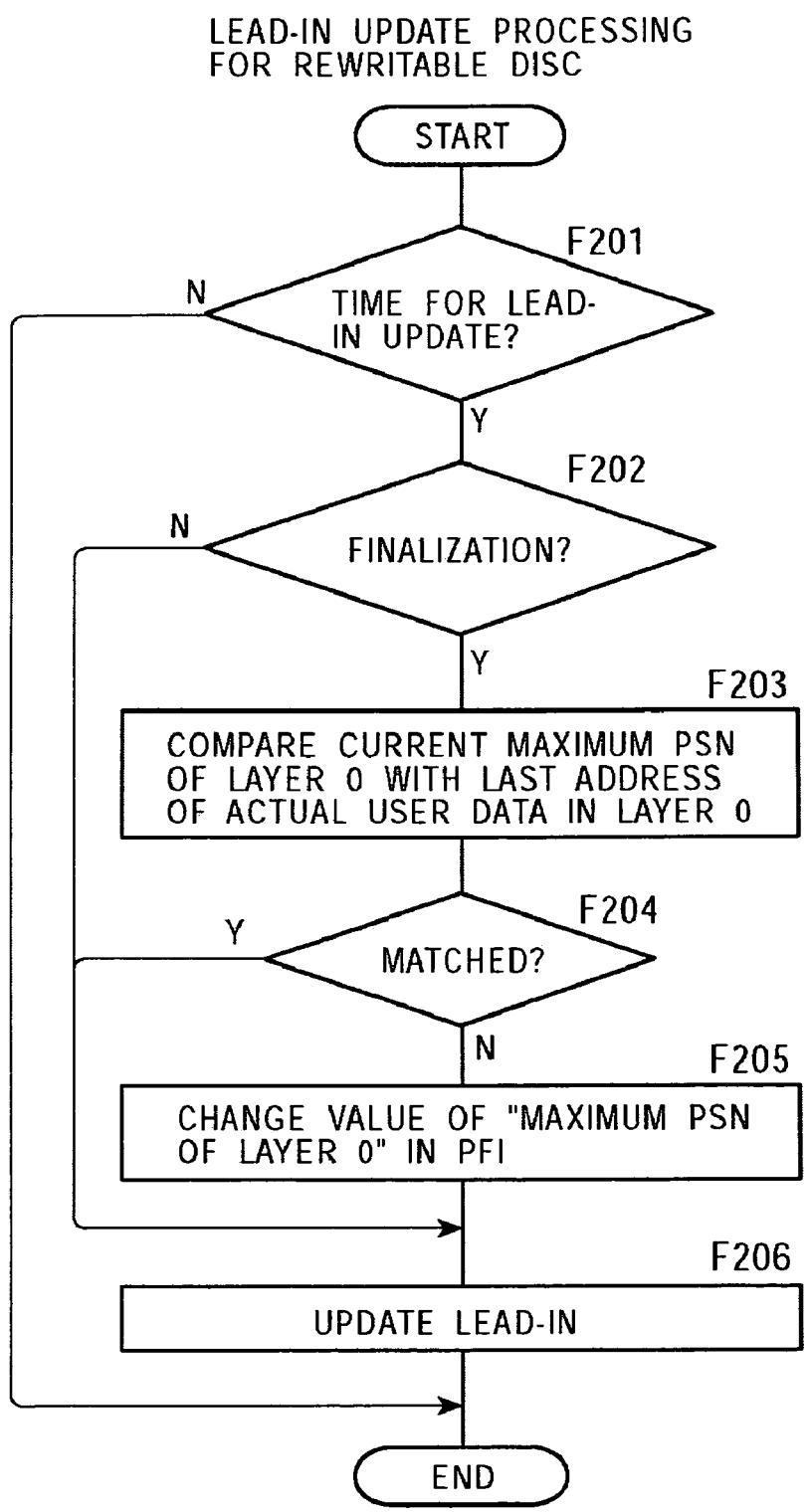
FIG. 12 is a flow chart showing a lead-in update processing for a rewritable disc in the embodiment.

FIG. 12 shows lead-in update processing performed by the controller 12 in such various cases.

When a lead-in update instruction or a finalization instruction is issued from host equipment or when a disc ejection instruction is given, the controller 12 determines that it is time for lead-in update and the process proceeds from step F201 to step F202 shown in FIG. 12.

In step F202, a determination is made as to whether or not the current lead-in update is to be performed as part of finalization.

When it is determined as not being for finalization, the process proceeds from step F202 to step F206, in which the lead in is updated. That is, control information in which the current recording state is reflected is recorded in the lead-in zone as file information of the recorded user data. Further, content of the PFI is also recorded in the control information. In this case, "maximum PSN" of layer 0" in the control information is not changed from a value obtained as ADIP information.

On the other hand, when it is determined in step F202 that the lead-in update is part of finalization, the process proceeds to step F203. In step F203, first, the last address where the user data is recorded in layer 0 is compared with the value of "maximum PSN of layer 0" obtained from the PFI in the ADIP information.

When the result of the comparison shows a match, the process proceeds from step F204 to step F206, in which the lead-in is updated. That is, control information in which the final recording state is reflected is recorded in the lead-in zone (or the lead-in is updated) as file information of the recorded user data. In this case, content of the PFI is also recorded in the control information, but "maximum PSN of layer 0" in the control information is not changed from a value obtained as ADIP information.

When the result of the comparison in step F203 does not show a match, the process proceeds from step F204 to step F205. In step F205, the value of "maximum PSN of layer 0" in the PFI which has been read is changed to the value of the last address at which the actual user data has been recorded.

In step F206, processing for updating the lead-in is performed. Specifically, control information in which the final recording state of the user data is reflected is recorded (i.e., updated) in the lead-in zone. The PFI in the control information contains the value changed in step F205 for "maximum PSN of layer 0", i.e., the value that has been changed in accordance with the actual recording state of the user data.

As described, when the lead-in update processing is performed on a rewritable disc, this means a case in which the disc is finalized. Furthermore, when the end of user data recorded in layer 0 is different from "maximum PSN of layer 0" in the PFI in the ADIP, the lead-in control information contains content of the PFI with "maximum PSN of layer 0" being changed.

2-4 Processing Upon Insertion of Disc

Processing when the disc 1 is inserted into the disc drive apparatus will now be described with reference to FIG. 13.

When the disc 1 is loaded, first, in step F301, the optical head 3 is mechanically moved to the inner-circumference side of the disc 1.

Next, in step F302, the disc 1 is illuminated with laser light from the optical head 3 at the inner-circumference side and the objective lens is forcibly moved in a focus direction. In the same manner, the number of recording layers and the disc type are identified.

As is well known to those skilled in the art, when the objective lens is forcibly moved in a focus direction, an S-shaped curve is observed from a focus error signal, which is obtained as a result of reflected-light information, in the vicinity of a focal point on the recording layer. Thus, observing S-shaped curves allows identification of the number of recording layers of the disc and the type of disc.

For example, during a period when the objective lens is moved from a position farthest from the disc to a position closest to the disc (or during a period when the objective lens is moved in the direction opposite thereto), when an S-shaped curve is observed once, the disc is identified as a single-layer disc, and when an S-shaped is observed twice, the disc is identified as a dual-layer disc.

For discs such as CDs, DVDs, and SACDs, the position of each recording layer in the thickness direction of the disc and the spacing between recording layers are different depending on each disc, so that the type of disc can be identified based on the observation timing of an S-shaped curve or the interval of occurrence of a plurality of S-shaped curves during a focus-search operation.

A recording/reproducing apparatus intended for a recordable disc is designed to perform observation by considering a difference in reflectance between recorded regions and unrecorded regions, and thus can perform precise observation even when the reflectance is low and S-shaped curves has small amplitude.

Thus, such a recording/reproducing apparatus can detect the difference of ROM type, rewritable type, and write-once type in accordance with a reflectance difference resulting from recording layers. This also makes it possible to determine whether or not pits (recording marks) are present, i.e., whether or not information is recorded on a groove disc.

When it is determined in step F302 that the disc 1 is not a groove disc, i.e., a read-only disc, the process proceeds from step F303 to step F306. In step F306, lead-in control information recorded in pits (recording marks) is read out.

On the other hand, when it is determined in step F302 that the disc 1 is a recordable disc, the process proceeds from step F303 to step F304. In step F304, first, the physical format information (PFI) recorded in a wobbling groove in the lead-in zone is read out.

When the disc 1 in the present embodiment is loaded, the controller 12 can recognize various types of information shown in FIG. 8 by reading the PFI, and can particularly recognize the first PSN of the data zone, the maximum PSN of the data zone, and the maximum PSN of layer 0 from the data zone allocation information shown in FIG. 9.

At this point, when it has been determined in step F302 described above that pits are not recorded in the lead-in zone of the recordable disc, the process proceeds from step F305 to step F307. In step F307, the value of "maximum PSN of layer 0" read from the PFI in the ADIP is determined as the actual maximum PSN of layer 0.

That is, when the disc 1 is a disc having an unwritten lead-in zone (e.g., a blank disc), the controller 12 determines the actual maximum PSN of layer 0 of the disc 1 based on the value of "maximum PSN of layer 0" which serves as ADIP information.

When it is has been determined in the determination processing in step F302 that pits are recorded (i.e., lead-in control information is written) in the lead-in zone of a recordable disc, the process proceeds from step F305 to step F306. In step F306, control information recorded as the pits (i.e., recording marks) in the lead-in zone is read out. For multi-session recording on a write-once disc, when a second session or later exists, intro information of the session is also read out.

As can be understood from the processing shown in FIGS. 11 and 12, control information in the lead-in and intros include content of the PFI.

When the control information is read out in step F306, in step F308, the value of "maximum PSN of layer 0" in the PFI content recorded in the control information is determined as the actual maximum PSN of layer 0.

That is, for a write-once disc to which lead-in (or intro) control information has been written by close processing or a rewritable disc having a lead-in zone to which information has been written even once, the controller 12 determines the actual maximum PSN of layer 0 of the disc 1, based on the value of "maximum PSN of layer 0" which serves as ADIP information.

As described above, when a recordable disc is loaded, the controller 12 first reads the ADIP information. Thus, based on the PFI contained in the ADIP information, the controller 12 can check the maximum address of each layer.

Thus, after the maximum address of a data zone in each layer is precisely checked, user data is recorded. For example, during the control of operations for setting a user-data recording region, a reproduction region, an access limit, and so on, processing is performed by referring to the maximum address of the data zone in each layer.

Such a capability of obtaining a maximum PSN that can be used for the data zone in layer 0, as described above, means that the maximum address of a data zone in each layer can be determined for each disc. Thus, this arrangement allows a disc drive apparatus to easily deal with even a data-zone change resulting from conventional format expansion/change. Controlling a recording/reproducing operation in accordance with data-zone allocation information obtained from the PFI in the ADIP allows execution of an operation corresponding to the format of data-zone of each disc.

By recognizing the maximum PSN of a data zone in each layer, the disc drive apparatus can perform appropriate operational control, such as regulating a movement during address-search and controlling the interlayer-return position during user-data recording.

Since "maximum PSN of layer 0" described above is information of expanded PFI information recorded in the ADIP, the disc drive apparatus does not require a change in hardware configuration and only requires a change in software for recognizing content of the PFI.

As can be seen from the processing shown in FIG. 13, after the PFI is reflected in the lead-in (or intro) control information, the maximum PSN of each layer is determined based on data-zone allocation information (such as "maximum PSN of layer 0") of the PFI in the control information. Thus, the maximum PSN of layer 0 is a value in which the last address at which actual user data is recorded is reflected, when the disc is in a state in which recording to layer 0 is completed (i.e., closed or finalized). Thus, even after the maximum PSN of each layer has been changed by recording user data and finalizing the recording, the controller 12 can accurately check the maximum PSN. This arrangement, therefore, allows optimized playback control.

While the disc drive apparatus can readily deal with a change in data-zone, as described above, the disc drive apparatus can also deal with a change in disc size. For example, the disc drive apparatus can deal with a capacity change due to addition of a disc-size standard (e.g., an 8-cm diameter disc).

3. Modification

Various modifications and application examples are possible to the present invention.

While the dual-layer recordable DVD discs has been described in conjunction with DVD+R and DVD+RW discs, the present invention is similarly applicable to other dual-layer discs, such as DVD-R, DVD-RW, and DVD-RAM discs.

Further, the present invention is effective for not only DVD system discs but also other types of discs, such as CD-system and Blue-ray disc system, and is also effective for not only discs but also media having a plurality of recording layers.

The dual-layer discs herein also refer to discs including so-called two-sided laminated discs.

While the description in the embodiment has been given in conjunction with the dual-layer discs, the present invention is preferably used for storage media having three or more recording layers.

According to the data-zone allocation information as shown in FIG. 9, the maximum address in the last data zone in the recording layer is recorded as "maximum PSN in the data zone". Thus, it is sufficient for an N-layer disc that each maximum PSN of the first layer to (N−1)th layer is recorded in the PFI.

For example, with the PFI structure shown in FIG. 8, a reserved byte (a byte indicated by "set to (00)") is utilized to provide a definition such that the maximum PSN in the data zone in each layer is recorded.

The data-zone allocation information containing "maximum PSN of layer 0" that serves as ADIP information for a disc is not limited to information that is recorded in the PFI configured as AUX data in the lead-in zone.

For example, the data-zone allocation information may be recorded using ADIP information in the data zone or another zone.

What is claimed is:

1. A storage medium comprising:
   a plurality of recording layers to which data is recordable; and
   wobbling grooves that are pre-formed in relation to the plurality of recording layers as recording tracks in accordance with addresses and physical format information,
   wherein the physical format information contains information of a maximum position at which user data is recordable in each recording layer.

2. The storage medium according to claim 1, wherein first one of the recording layers has a first data zone, in which the user data is recorded, and a lead-in zone, provided at the inner-circumference side of the first data zone; second one of the recording layers is laminated with the first recording layer and has a second data zone, in which the user data is recorded, and a lead-out zone, provided at the inner-circumference side of the second data zone; and the maximum position information is recorded by wobbling the recording tracks in the lead-in zone.

3. The storage medium according to claim 2, wherein the addresses are recorded in the first data zone from the inner-circumference side toward the outer-circumference side and are recorded in the second data zone from the outer-circumference side toward the inner-circumference side, and middle areas are provided at the outer-circumference side of the first and second data zones.

4. The storage medium according to claim 2, wherein the maximum position information contains a maximum address in the first data zone.

5. The storage medium according to claim 4, wherein the maximum position information contains a maximum address in all data zones including the first and second data zones.

6. The storage medium according to claim 2, wherein the maximum position information is repeatedly recorded in the lead-in zone.

7. A recording/reproducing apparatus for a storage medium having a plurality of recording layers to which data is recordable and having addresses and physical format information which are pre-recorded with wobbles of grooves that provide recording tracks, the physical format information containing information of a maximum position at which user data is recordable in each recording layer, the recording/reproducing apparatus comprising:
   a recording/reproducing unit for recording and/or reproducing data to and/or from each recording layers;
   a groove-information reading unit for reading the addresses and the physical format information which are recorded with the wobbles of the grooves; and
   a controlling unit for checking a user-data-recordable maximum position based on the physical format information read by the groove-information reading unit, to control a recording/reproducing operation.

8. The recording/reproducing apparatus according to claim 7, wherein the controlling unit causes the recording/reproducing unit to record control information, containing the physical format information, in a predetermined region of the storage medium at predetermined timing after recording of the user data, and the value of the maximum position information is changed in accordance with an actual recording state of the user data, the maximum position information being a content of the physical format information contained in the control information.

9. A recording/reproducing method for a storage medium having a plurality of layers to which data is recordable and having addresses and physical format information which are pre-recorded with wobbles of grooves that provide recording tracks, the physical format information containing information of a maximum position at which user data is recordable in each recording layer, the recording/reproducing method comprising:
   a groove-information reading step of reading the addresses and the physical format information which are recorded with the wobbles of the grooves;
   a checking step of checking a user-data-recordable maximum position based on the physical format information read in the group-information reading step; and
   a controlling step of performing predetermined control for a recording/reproducing operation, in accordance with the user-data-recordable maximum position checked in the checking step.

10. The recording/reproducing method according to claim 9, further comprising a control-information recording step of recording control information, containing the physical format information, in a predetermined region of the storage medium at predetermined timing after recording of the user data, wherein, in the control-information recording step, the value of the maximum position information is changed in accordance with an actual recording state of the user data, the maximum position information being a content of the physical format information contained in the control information.

* * * * *